Figure 2:
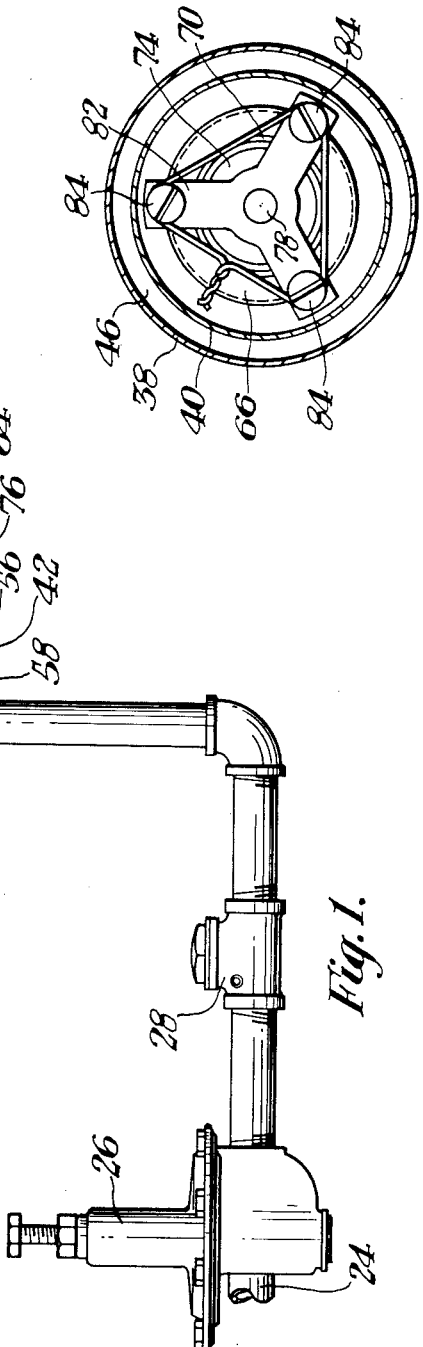

June 26, 1956

L. M. PUSTER 2,752,095

FLUID MIXING DEVICE

Filed May 22, 1952

INVENTOR.
Louis M. Puster.
BY
Albert J. Henderson
HIS ATTORNEY

United States Patent Office 2,752,095
Patented June 26, 1956

2,752,095

FLUID MIXING DEVICE

Louis M. Puster, Knoxville, Tenn., assignor to Robertshaw-Fulton Controls Company, Greensburg, Pa., a corporation of Delaware Application May 22, 1952, Serial No. 289,322

9 Claims. (Cl. 236—12)

This invention relates to fluid mixing devices and more particularly to apparatus for mixing a plurality of fluids of different temperatures to produce a mixture having a substantially constant predetermined temperature.

In devices of this type, as for example water mixers, wherein cold water is mixed with and heated by hot water, steam or the like, difficulty has hitherto been encountered in producing a mixture the temperature of which will remain substantially constant irrespective of changes in the temperatures, pressures and rates of flow of the fluids being mixed. Such mixers as are now known perform fairly satisfactorily as long as there are no substantial changes in the pressures and rates of flow of the various fluids supplied to the mixing device, but trouble is often experienced when such changes do occur as these changes are accompanied by a "hunting" action of the valves which permits alternate slugs of hot and cold fluid to pass through the mixer. To reduce this hunting to a minimum, the temperature sensing device controlling fluid supply must be as close as possible to the zone where actual mixing occurs. In the past, it has been impractical to place the temperature sensing device within the mixing zone itself and as a result, the regulators over-controlled with consequent hunting.

It is therefore one of the objects of this invention to mix a plurality of fluids so as to produce a mixture the temperature of which is accurately maintained within narrow limits and at a predetermined standard regardless of the differences and changes in the temperatures, pressures and rates of flow of the fluids being mixed.

Another object of this invention is to mix a plurality of fluids within a temperature sensitive device and utilize such device to control the proportions of the fluids mixed.

Another object of this invention is to utilize a temperature sensing unit as a mixing chamber.

Another object of this invention is to mix a plurality of fluids in a mixing device and keep such mixture in contact with the temperature sensing unit throughout its passage through the mixing device.

Another object is to mix a plurality of fluids by injecting one fluid into the other through a nozzle immersed in the one fluid and providing an adjustable helical orifice.

Another object of this invention is to adjust the area of a helical orifice in a mixing chamber in accordance with pressure variations in the chamber.

In a preferred embodiment of the invention, a thermally responsive unit is constructed and arranged to provide a mixing chamber and the fluids to be mixed are admitted thereto, one of the fluids being controlled by the temperature responsive unit and entering the chamber in the form of a helical spray ejected from between contiguous turns of a helical nozzle element.

Figure 1:
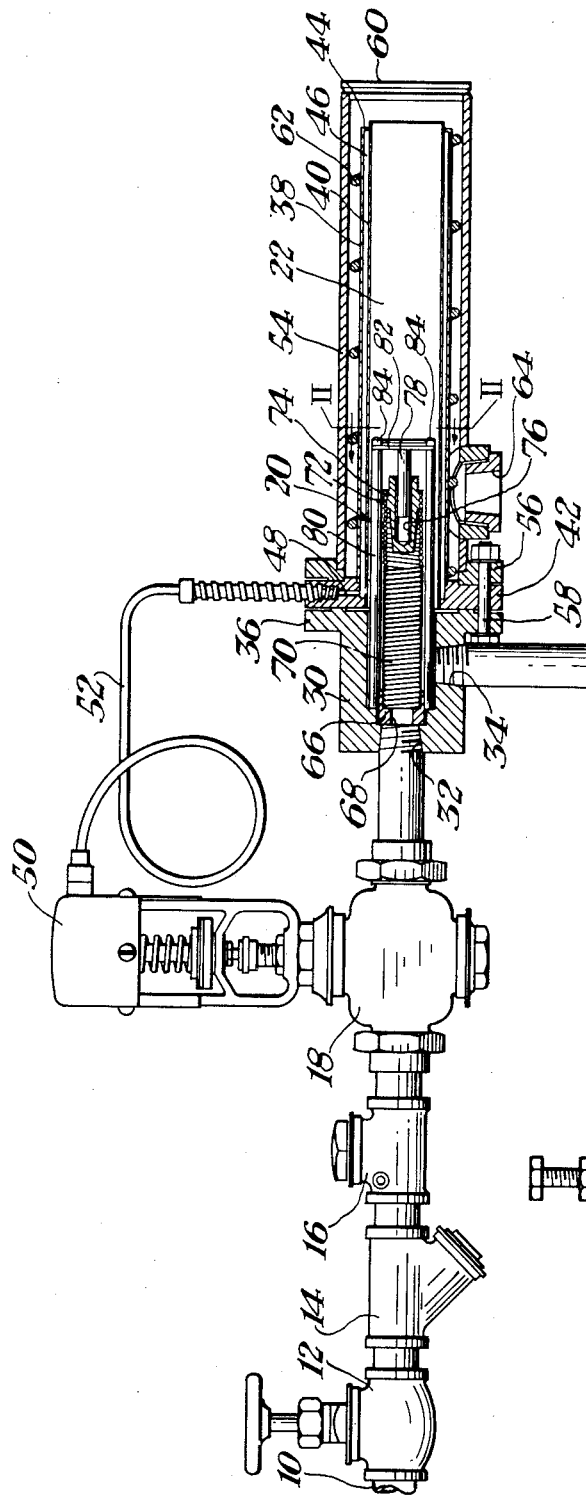

Other objects and advantages will become apparent from the following specification taken in connection with the accompanying drawings wherein:

Fig. 1 is a side elevation, partly in section, of a fluid mixing device which constitutes one embodiment of the present invention; and Fig. 2 is an enlarged cross-section taken on the line II—II of Fig. 1.

Referring more particularly to the drawing, the fluid mixing device shown therein comprises a water mixer of the type wherein cold water and a hot fluid, such as hot water or steam, are supplied to a mixing chamber where they are thoroughly mixed and the cold water is heated, the resulting mixture being maintained at a substantially constant temperature. As shown, the hot fluid is supplied from any suitable source through a pipe or conduit 10 having interposed therein a manually operable valve 12, a strainer 14, a check valve 16, a thermostatically controlled throttle valve 18 providing passage into the interior of a mixing nozzle 20 which is located within and adapted to discharge the hot fluid into a substantially cylindrical mixing chamber 22. The cold fluid is supplied from any suitable source through a pipe or conduit 24 having interposed therein a pressure regulator 26 and a check valve 28 providing passage into the mixing chamber 22 where it is delivered to the space surrounding the nozzle 20. The pressure regulator 26 is set to maintain the cold fluid entering the mixing chamber 22 at a pressure below the minimum pressure of hot fluid entering the nozzle 20.

The mixing chamber 22 is formed in the mixing assembly which, in the form shown, includes a hollow casing 30 provided with an axially located inlet 32 and a laterally located inlet 34 which are connected to the sources of hot and cold fluids respectively. The casing 30 is provided at its open end with a radially extending flange 36 for connection with other casing elements as will more fully appear hereinafter.

Thermally responsive means define the walls of the mixing chamber 22 which is maintained in communication with the interior of the casing 30. Such means takes the form of a pair of radially spaced, elongated, telescoped tubes 38, 40 each of which is connected at one end to an annular flange 42. An annular partition carried on the other end of the tube 38 is connected at its inner periphery to the wall of the tube 40 and serves, in conjunction with the tubes 38, 40 and the flange 42, to define an enclosed, substantially annular space 46 surrounding the mixing chamber 22.

The flange 42 is adapted to abut the flange 36 on the casing 30 in fluid sealing relation therewith and is provided with a radially extending bore 48 which communicates with the annular space 46. A suitable fluid pressure motor 50, which forms a part of the thermostatically controlled valve 18, is maintained in communication with the bore 48 in the flange 42 by a capillary tube 52. The pressure motor 50, capillary tube 52 and annular space 46 thus define a closed pressure system and such system contains a suitable thermally responsive medium such as an expansible fluid. As pressure operated thermally responsive systems of this type are well known, further description thereof is deemed to be unnecessary; suffice it to set out that fluid flow through the valve 18 is controlled in response to temperatures sensed by the thermally responsive medium in the space 46.

A receptacle for the reception of mixed fluids flowing from the open end of the chamber 22 is provided and may take the form of a generally cylindrical casing 54 telescoped over and spaced radially from the tube 38. Carried on one end of the casing 54 is an annular flange 56 which is adapted to abut the flange 42 in fluid sealing relation therewith. The flanges 36, 42, 48 are securely clamped together by any suitable means which may take the form of a plurality of bolts 58 (only one of which is shown).

The other end of the casing 54 is closed by a plug member 60 which is disposed in line with the outlet of the mixing chamber 22 and which serves to reverse the flow of the stream of mixed fluids flowing from the mixing chamber 22 thereby directing such stream into the annular space between the tube 38 and the casing 54. To prevent stratification and to insure intimate contact between the stream of mixed fluids flowing between the tube 38 and the casing 54, a guide element 62 is formed on the outer surface of the tube 38. The guide element 62 is preferably a helical coil of wire having a plurality of spaced turns and of sufficient diameter to fit closely between the outer wall of the tube 38 and the inner wall of the casing 54. The stream of mixed fluids is thereby directed in a helical path around the tube 38 and flows from right to left as viewed in the drawing to an outlet 64 formed in the casing 54 proximate the flange 56.

The nozzle 20 is connected to the inlet 32 to admit a finely divided spray of hot fluid to the mixing chamber 22 along a portion of the length thereof. The nozzle 20 comprises a ported plug 66 threaded into the casing 30 with the port 68 therein communicating with the inlet 32. Threaded into the port 68 of the plug 66 is an element 70 which defines a generally helical orifice through which fluid may flow from the nozzle 20. The element 70 comprises a filamentous member 72 of resilient material such as stainless steel or the like which is wound in the form of a helix with contiguous turns thereof normally contacting each other. One end of the helical element 70 is threaded into the port 68 in the plug 66 and may be secured therein by welding or the like. The other end of the helical element 70 is closed by an elongated head element 74 which is threaded into the element 70 and secured by welding or the like.

It will be apparent that elongation of the helical element 70 will separate contiguous turns thereof to thereby provide a generally helical orifice providing communication between the interior of the helical element 70 and the mixing chamber 22. The head 74 is mounted to permit such elongation while preventing lateral deflection of the element 70. More specifically, the head 74 is provided with an axially extending recess 76 which slidably receives one end of a pintle 78. A plurality, here shown as three, of spaced rods 80 are secured at circumferentially spaced points to the plug 66 by welding or the like and extend in parallel relation with the axis of the helical element 70 alongside the outer surface thereof. The rods 80 terminate in a common plane which is spaced from the end of the head 74 when the helical element 70 is in its non-extended condition, such plane being disposed normal to the axis of the helical element 70. A spider 82 is disposed in the aforesaid plane and is connected to the rods 80 by any suitable means, such as screws 84. The end of the pintle 78 which extends out of the recess 76 is secured to the spider 82 by any suitable means such as brazing or the like.

It will be apparent that the assembly of the spider 82 and pintle 78 is fixed relative to the plug 66 to thus provide a guide for the head 74. In a preferred form, the lengths of the rods 80 are selected to so position the spider 82 that the head 74 will contact the same upon a predetermined elongation of the helical element 70 so that excessive elongation thereof is precluded.

The recess 76 may be lined with a suitable bearing material and the fit of the pintle 78 therein is preferably snug enough to permit the pintle 78 and head 74 to act as a dashpot for damping fluctuation of the head 74.

In addition to the combined guide and dashpot function of the head 74 which has been hereinbefore described, the head 74 acts as a piston to regulate the degree of elongation of the helical element 70 in accordance with the differential between the pressure within the helical element 70 and the pressure in the mixing chamber 22. This function will be more fully brought out in the following description of the operation of the device.

*Operation*

With the structure described, cold fluid enters one end of the mixing chamber 22 through the inlet 34, surrounds the nozzle 20 and flows along the same from left to right as viewed in the drawing. Hot fluid enters the interior of the nozzle 20 and is ejected through the space between contiguous turns of the helical element 70 in the form of a helical spray which intimately mixes with the stream of cold fluid surrounding the nozzle 20. The mixture then flows out of the mixing chamber 22 in the form of a stream which impinges upon the plug member 60, reverses itself, and flows to the outlet 64 along the helical path defined by the casing 54, tube 38, and guide element 62. It is to be noted that the telescoped tubes 38, 40 not only define the mixing chamber and a wall of the outlet passage but also comprise the heat exchange elements of the temperature responsive device controlling operation of the throttle valve 18. A mixing device capable of responding substantially instantaneously to variations in the temperature of the mixed fluids is therefore provided.

The manner of operation of the hereinbefore described embodiment of the present invention may be summarized as follows: Assume that no fluid is being withdrawn through the outlet 64 of the casing 54, then the pressure within the helical element 70 of the nozzle 20 will be equal to the pressure in the mixing chamber 22 and the various parts of the apparatus will be in the positions shown in Fig. 1, the helical element 70 being in its contracted condition with adjacent turns thereof contacting each other. As fluid is drawn off through the outlet 64, the pressure in the mixing chamber 22 will be reduced relative to the fluid pressure within the helical element 70 and the nozzle head 74 will be moved to the right as viewed in the drawing to thereby elongate the helical element 70 and separate contiguous turns thereof. Elongation of the helical element 70 thus creates a helical aperture over the entire free length of the element 70 and the hot fluid will flow through such aperture in the form of a helical spray to mix with the stream of cold fluids surrounding the nozzle 20. If the flow from the outlet 64 is increased, the pressure differential between the fluid pressure within the helical element 70 and the fluid pressure in the mixing chamber 22 will be increased causing the nozzle head 74 to move further along the guide pintle 78 thereby increasing the area of the helical aperture defined by the helical element 70. Thus, the flow of fluid through the nozzle 20 is automatically adjusted in accordance with the demand for the mixed fluids and such adjustment is effected independently of the thermostatic element.

In the event that the temperature of the mixture within the mixing chamber 22 varies from the preselected value, the volume of the temperature sensing medium within the closed system including the annular space 46, capillary tube 52 and pressure motor 50 will vary to cause the throttle valve 18 to adjust the rate of flow to the nozzle 20.

It will be apparent that the action of the nozzle 20 in automatically adjusting the area available for fluid flow to meet the demand on the mixer combined with the sensitive operation of the thermally responsive means (due to the temperature sensing element thereof being in contact with the stream of mixed fluids during mixing and throughout its flow through the mixer) results in more uniform controlled temperature of the mixed fluids and quieter operation of the mixer.

It will also be apparent that with the apparatus described, flow of the cold fluid into the hot fluid will be precluded since the nozzle 20 closes and thus acts as a check valve upon a decrease in draw-off. This feature is of particular value when the hot fluid is steam since flow of cold fluid into steam causes sudden condensation thereof in the steam inlet with attendant undesirable hammering in the system.

While a particular construction is herein shown and described with some detail, it will be understood that various changes may be made in the construction within the scope of the appended claims.

It is claimed and desired to secure by Letters Patent:

1. In a device for mixing fluids of different temperatures to obtain a mixture of substantially uniform temperature, the combination of means providing a mixing chamber including a plurality of walls defining a substantially annular enclosed space and surrounding said chamber, a thermally responsive medium in said space, means for supplying one of the fluids to be mixed directly to said chamber, means for supplying another of the fluids to be mixed directly to said chamber, and control means responsive to temperature conditions sensed by said medium for controlling the supply of at least one of the fluids to said chamber.

2. In a device for mixing fluids of different temperatures to obtain a mixture of substantially uniform temperature, the combination of means defining a mixing chamber including a double-walled conduit, the walls of said conduit surrounding said mixing chamber and being spaced from each other to provide a substantially annular enclosed space, a thermally responsive medium in said space, means for supplying one of the fluids to be mixed directly to said chamber, means for supplying another of the fluids to be mixed directly to said chamber, and means responsive to temperature conditions sensed by said medium for controlling the supply of at least one of the fluids to said chamber.

3. In a device for mixing fluids of different temperatures to obtain a mixture of substantially uniform temperature, the combination of a receptacle for containing the mixed fluids and having an outlet, means defining a mixing chamber including a double-walled conduit having an open end extending into said receptacle, the walls of said conduit being spaced from each other to provide a substantially annular enclosed space, a thermally responsive medium in said space, separate means for supplying each of the fluids to be mixed directly to the interior of said conduit, means responsive to temperature conditions sensed by said medium for controlling the supply of at least one of the fluids to said conduit, and means for reversing the stream of mixed fluids flowing from said open end of said conduit and directing said stream along the outer wall of said conduit to said outlet.

4. In a device for mixing fluids of different temperatures to obtain a mixture of substantially uniform temperature, the combination of means providing an elongated mixing chamber having an outlet and including a plurality of walls defining a substantially annular enclosed space, a thermally responsive medium in said space, a nozzle including a helical element in said chamber extending longitudinally thereof, means for supplying one of the fluids to said chamber for flow around said element to said outlet, means for supplying the other of the fluids to the interior of said element to be ejected in a helical spray between contiguous turns thereof for intimate mixing with the one fluid, and means responsive to temperature conditions sensed by said medium for controlling the supply of the other fluid to said element.

5. A mixing device as claimed in claim 4 wherein means responsive to the pressure of the mixed fluids in said chamber is provided for adjusting the length of said element to thereby control the spacing between said contiguous turns.

6. In a device for mixing fluids of different temperatures to obtain a mixture of substantially uniform temperature, the combination of a receptacle for containing the mixed fluids and having an outlet, a mixing chamber including a double-walled conduit communicating with said receptacle, the walls of said conduit being spaced to provide a substantially annular enclosed space, a thermally responsive medium in said space, a nozzle including a helical element in said chamber extending longitudinally thereof, means for supplying one of the fluids to said chamber for flow around said element to said outlet, means for supplying the other of the fluids to the interior of said element to be ejected in a helical spray between contiguous turns thereof for intimate mixing with the one fluid, means responsive to temperature conditions sensed by said medium for controlling the supply of the other fluid to said element, and means for reversing the stream of mixed fluids flowing from said conduit and directing said stream along the outer wall of said conduit to said outlet.

7. A mixing device as claimed in claim 6 wherein means responsive to the pressure of the mixed fluids in said chamber is provided for adjusting the length of said element to thereby control the spacing between said contiguous turns.

8. In a device for mixing fluids of different temperatures to obtain a mixture of substantially uniform temperature, the combination of a receptacle for containing the mixed fluids and having an outlet, means defining a mixing chamber including a double walled conduit having an open end extending into said receptacle, the walls of said conduit being spaced from each other to provide a substantially annular enclosed space, a thermally responsive medium in said space, separate means for supplying each of the fluids to be mixed directly to the interior of said conduit, means responsive to temperature conditions sensed by said medium for controlling the supply of at least one of the fluids to said conduit, and means for reversing the stream of mixed fluids flowing from said open end of said conduit and directing said stream along the outer wall of said conduit to said outlet, said last named means including a guide element for conducting said stream in a helical path along said outer wall of said conduit.

9. A device for mixing fluids as claimed in claim 8 wherein said receptacle includes an annular wall concentric with said conduit, said guide element extending between said annular wall and said outer wall of said conduit.

References Cited in the file of this patent

UNITED STATES PATENTS

| | | |
|---|---|---|
| Re. 14,836 | Ruud | Apr. 6, 1920 |
| 181,288 | Shaw | Aug. 22, 1876 |
| 853,504 | Eddy | May 14, 1907 |
| 1,246,355 | Thomas | Nov. 13, 1917 |
| 1,784,465 | Pepper | Dec. 9, 1930 |
| 2,455,498 | Kern | Dec. 7, 1948 |
| 2,515,885 | Midyette | July 18, 1950 |